Patented Jan. 15, 1946

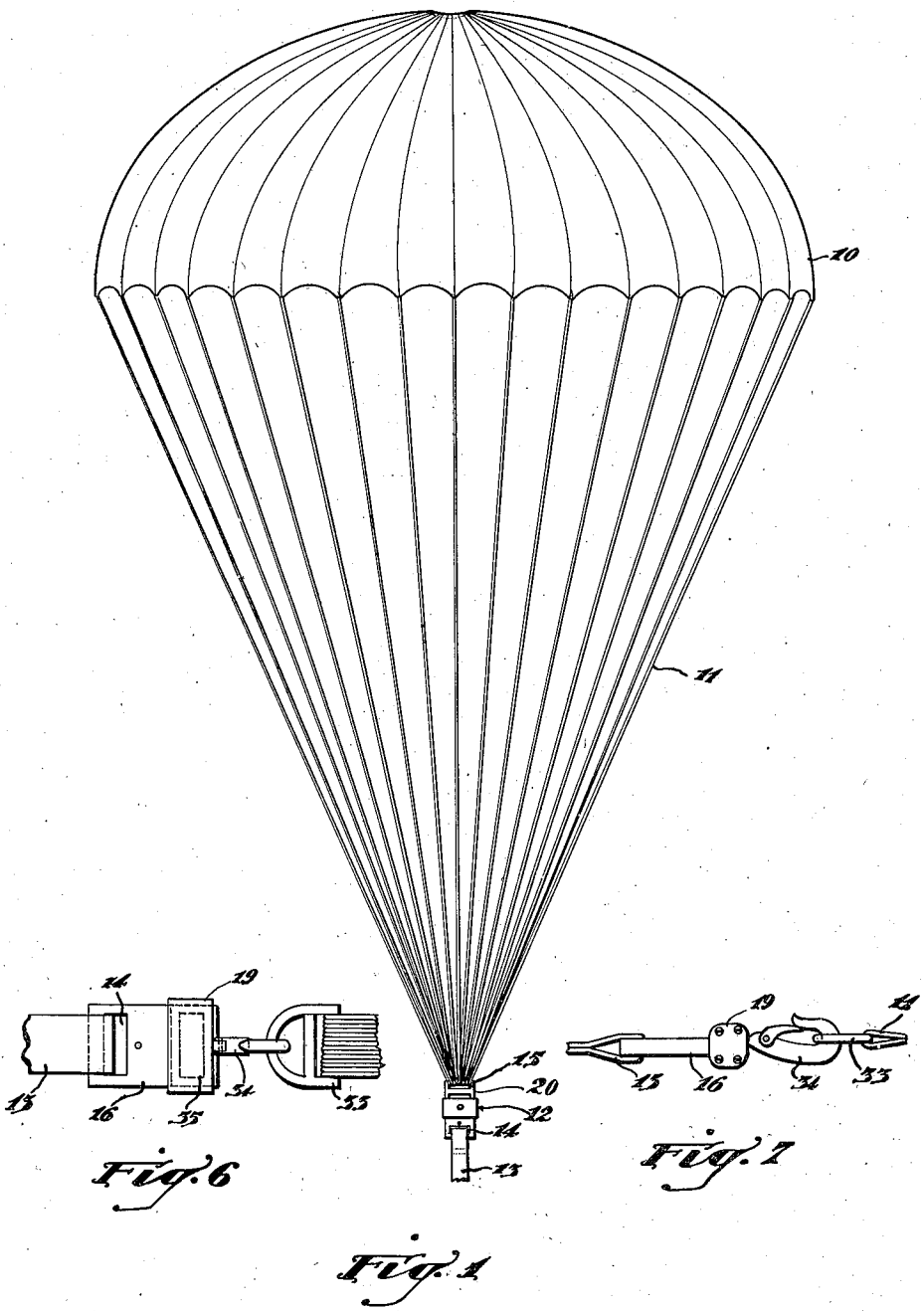

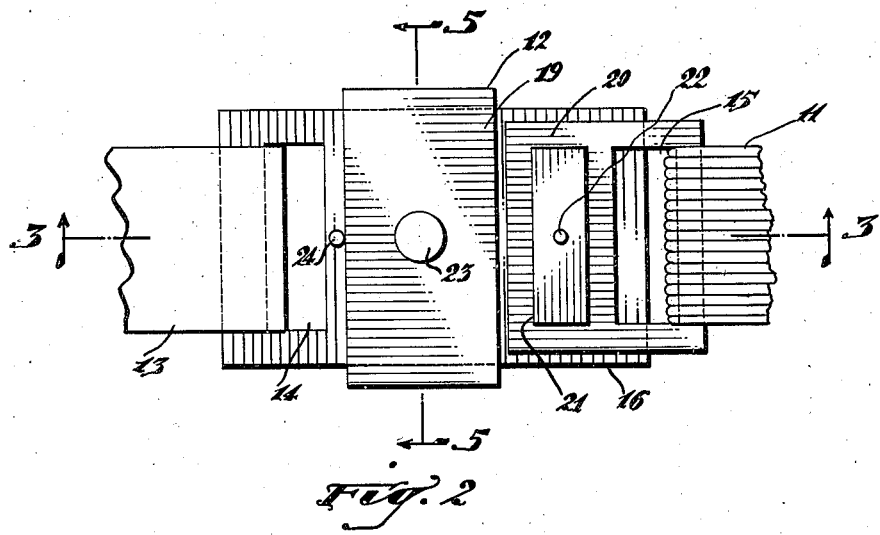

2,393,072

UNITED STATES PATENT OFFICE 2,393,072

PARACHUTE RELEASE DEVICE

Charles W. Skinner, Cincinnati, Ohio, assignor to Fashion Frocks, Inc., Cincinnati, Ohio, a corporation of Ohio Application May 23, 1944, Serial No. 536,905

1 Claim. (Cl. 24—223)

This invention relates to a device for disconnecting certain of the component elements of a parachute, and it is particularly concerned with a device used to release the parachute canopy from the harness, although the utility is not necessarily limited to this exact function.

For disconnecting a parachute canopy after the parachutist has reached the ground it has been conventional in the past to provide a snap connection between the connector ring to which the shroud lines are attached and the parachute harness worn by the jumper, and to provide also means for the ready disengagement of the harness. This last means is ordinarily located centrally on the harness and, upon disengagement, completely detaches the harness, shroud lines, and canopy as a single unit. Although following a jump it is theoretically possible to disengage the snap joining the connector ring and the harness, in practice this is exceedingly difficult to accomplish if there is any strain at all on the line such as, for example, when a high wind is blowing.

It is also quite difficult for the parachutist to disengage himself from the harness straps when there is a strain on the line since these straps conventionally fit over both of his arms and legs. Where time is of the essence, as in a military operation, any difficulty whatsoever in the disengagement of the parachute canopy and shroud lines may mean the difference between life and death to the wearer and may even affect seriously the course of the operation. Actually there is no particular reason why it should be necessary to disengage the harness immediately upon landing since, after the harness has been disconnected from the shroud lines and canopy, it constitutes only a very slight encumbrance to the wearer and does not interfere with the performance of such military duties as may be required immediately upon landing.

While the desirability of disconnecting the shroud lines and canopy without disconnecting the harness has been suggested in the past the earlier structures provided for this purpose have been subject to the objection that they lacked the safety elements which are absolutely essential in this type of device. Obviously, if a means is to be provided for quickly releasing the shroud lines and canopy from the harness that means must be one which is exceedingly strong and sure in its operation and one which cannot conceivably become accidentally disengaged.

One of the objects of the present invention has been to provide a device that meets these requirements; that is, a device which provides a strong and sure connection, which, however, can be quickly and easily disengaged intentionally but not accidentally.

Another object has been to provide a latch in which the disengagement can be accomplished just as readily when the elements are under a strain such as that caused by a high wind, as under ordinary circumstances.

Another object has been to provide a device which can be utilized with present standard equipment including the connector ring and snap which are now in conventional use. Alternatively, by a slight redesigning of the standard connector ring the snap can be omitted and the device of the invention will function in lieu thereof.

Another object has been to provide a device of simple construction in which there is a minimum of possibility of loss or impairment of utility due to the wear or breakage of the parts.

Other and further objects and advantages will be apparent from the further and more detailed description of the invention when considered in conjunction with the drawings in which:

Figure 1 represents a perspective view of a parachute assembly with the canopy in open position and the device of the invention installed as a connector element between the connector ring and the harness.

Figure 2 is a top plan view of the device of the invention in open or unlatched position.

Figure 3 is a sectional view along the line 3—3, Figure 2, the sleeve in this view being of a slightly modified form from that shown in Figure 2.

Figure 4 is a similar sectional view showing the device in latched position.

Figure 5 is a sectional view along the line 5—5, Figure 2.

Figure 6 is a top plan view of the invention utilized in conjunction with a standard connector ring and snap.

Figure 7 is a side elevation of the same elements shown in Figure 6.

As shown in Figure 1 the parachute canopy is indicated generally at 10 and the shroud lines at 11. The release device of the invention is indicated at 12. A harness strap 13 is shown inserted and fastened through a slot 14 in the release device. The shroud lines are secured through a similar slot 15 in the connector ring 20 to which the shroud lines are secured.

The device 12 comprises a metal plate 16 into which the slot 14 has been formed at one end thereof. A lug 17 projects upwardly from the plate at the end opposite to that in which the slot is formed. This lug may be of substantially rectangular shape as shown. Intermediate the slot and lug is a central portion 18 forming the main body of the plate. This portion is preferably of substantially the same thickness as the lug to permit a slidable engagement of both members by the sleeve 19.

The connector ring 20 as shown in Figures 1–3 is of a construction which has been varied somewhat from the standard construction to permit it to be utilized with the device of the present invention. Although the slot 15 is standard in this part a second slot 21 has been formed in the embodiment shown and this slot is adapted to encompass exactly the lug 17 on the plate 16. Alternatively, where a connector ring 33 of the standard type shown in Figures 6 and 7 is utilized a standard snap 34 of the type also shown in these figures may be secured to the connector ring in the manner shown. This snap conventionally includes a slot 35 of the same size and configuration as the slot 21 and in the conventional construction is utilized to support the harness straps.

A pin 22 is positioned vertically in a corresponding bore in the lug 17. The lower end of this pin has the head 29 formed integrally with it. This head and the head 30 of similar configuration enclose the spring 31 positioned in the vertical bore 32 in the lug. This spring normally forces the pin 22 outwardly from the lug in the manner shown in Figure 3.

A slidable sleeve 19 is positioned on the plate and operates to hold the connector ring 20 in position on the lug 17. This sleeve which may be of generally rectangular configuration has a button 23 positioned medially in a vertical bore 38 therein. This button includes a head portion 25 and a shank portion 26 which depends into the hollow bore 27. A head 28 is secured to the lower end of the shank portion. As the sleeve 19 is moved along the plate toward the connector ring the pin 22 is depressed by the inclined surface 36 until its upper edge is substantially level with the upper surface of the lug. As the movement proceeds, the pin 22 contacts the head 28 and the action of the spring 31 forces the pin upwardly and extends the head to the position shown in Figure 4. At this point the device is in locked position.

In unlocking, the button 23 is first depressed until the upper edge of the pin 22 is substantially level with the upper surface of the body portion 18 of the plate 16. The sleeve is then moved toward the slot 14 until it assumes the position shown in Figure 3 and the connector ring 20 may be lifted off the lug 17. A stop pin 24 prevents movement of the sleeve 19 beyond the body portion 18.

As shown in Figure 5, the sleeve 19 may be formed in sections secured together by the screws 37. However, if desired, it may also be formed as a single integral piece.

It will be apparent from a consideration of the operation of the device that when it is in locked position, as shown in Figure 4, it cannot be disengaged unless two distinct operations are performed. In the first place, the button 23 must be depressed and, in the second place, the sleeve 19 must be slid toward the slot 14 sufficiently to disengage the sleeve from the connector ring. The possibility of this series of movements being performed accidentally is exceedingly remote.

One of the most important advantages of the device is that the disconnection can be accomplished equally well when the elements are under strain. Such conditions would have no effect whatsoever on the operations of depressing the button 23 and moving the slidable sleeve, while the operation of lifting the connector ring 20 from the lug 17 is easy of accomplishment under any conditions.

As shown particularly in Figures 6 and 7, the device of the invention may be utilized in conjunction with the standard connector ring and the standard snap illustrated in these figures as well as with the specially configurated connector ring shown in Figures 1–5. Where the standard snap is employed the slot 35 in this snap 34 is utilized instead of the slot 21 formed in the particular connector ring shown in the embodiment illustrated in Figures 1–5.

While the invention has been disclosed particularly in connection with a passenger parachute with or without minor modifications falling well within the scope of the invention, it may be used equally well in tow targets and for cargo and supply dropping. It may also be utilized in conjunction with a safety belt of the type utilized by airplane passengers.

While in its preferred embodiment the invention contemplates the formation of the sleeve 19 from metal, in certain utilities such as, for example, cargo and supply dropping, it may be possible to form the sleeve from cloth or leather, possibly reenforced by metal or fiber.

Having described my invention, I claim:

A device for detachably securing the connector ring of a parachute to the harness thereof comprising a plate having a slot therein for attachment to the harness and a lug projecting from the outer surface of the plate for engagement with a slot in the connector ring and means for preventing disengagement of the connector ring from the lug, said means including a pin inserted in a bore in the lug, spring means normally actuating the pin outwardly, a slidable sleeve positioned on the plate, said sleeve having an inner surface inclined away from the plate to facilitate the movement of the sleeve over the pin and having an aperture therein for the reception of the pin in locking engagement when the sleeve is in superimposed position on the lug.

CHARLES W. SKINNER.